US00RE47487E

(19) United States
(12) Reissued Patent
Angle et al.

(10) Patent Number: US RE47,487 E
(45) Date of Reissued Patent: Jul. 2, 2019

(54) NETWORK-BASED SERVICE ACCESS FOR WIRELESS COMMUNICATION DEVICES

(71) Applicant: Sony Mobile Communications AB, Lund (SE)

(72) Inventors: Travis Angle, Durham, NC (US); Daniel Dzuban, Wake Forest, NC (US); Graeme M. Gibbs, Madrid (ES); Jeffrey Griffin, Harrisburg, NC (US); Joachim Karlsson, Kävlinge (SE); Seneca D. Meyer, Garner, NC (US); Kenneth Douglas Norbury, Sandbach (GB)

(73) Assignee: SONY CORPORATION, Tokyo (JP)

(21) Appl. No.: 15/381,789

(22) Filed: Dec. 16, 2016

Related U.S. Patent Documents

Reissue of:
(64) Patent No.: 8,914,463
Issued: Dec. 16, 2014
Appl. No.: 12/791,292
Filed: Jun. 1, 2010

U.S. Applications:
(60) Provisional application No. 61/287,343, filed on Dec. 17, 2009.

(51) Int. Cl.
*G06F 15/16* (2006.01)
*H04M 1/725* (2006.01)
(Continued)

(52) U.S. Cl.
CPC ..... *H04M 1/72552* (2013.01); *H04L 51/14* (2013.01); *H04L 67/16* (2013.01); *H04L 67/22* (2013.01); *H04L 69/18* (2013.01); *H04W 4/21* (2018.02); *H04L 51/32* (2013.01); *H04L 51/36* (2013.01); *H04L 51/38* (2013.01)

(58) Field of Classification Search
CPC .... H04M 1/72552; H04L 69/18; H04L 67/16; H04L 67/22; H04L 51/14; H04L 51/36; H04L 51/38; H04L 51/32; H04W 4/206
See application file for complete search history.

(56) References Cited

U.S. PATENT DOCUMENTS 6,714,793 B1 * 3/2004 Carey ..... H04L 51/04 455/412.1
7,069,008 B1 * 6/2006 Hill et al. ..... 455/434
(Continued)

FOREIGN PATENT DOCUMENTS

FR 2930099 A1 10/2009
WO WO 2004/068879 8/2004
(Continued)

OTHER PUBLICATIONS

European Search Report issued Feb. 25, 2011 in re Application No. EP10 015 724.7 filed Dec. 16, 2010.

*Primary Examiner* — Jeffrey D Carlson
(74) *Attorney, Agent, or Firm* — Tucker Ellis LLP

(57) ABSTRACT

A device and method facilitates communication with a network-based service or application such as a Social Networking Service (SNS), for example. The device may be a cellular telephone that is not normally equipped to communicate with such services. However, a controller in the device selects a bearer service that can be used to communicate with the service.

32 Claims, 7 Drawing Sheets

(51) Int. Cl.

| | |
|---|---|
| ***H04L 29/08*** | (2006.01) |
| ***H04W 4/21*** | (2018.01) |
| ***H04L 29/06*** | (2006.01) |
| ***H04L 12/58*** | (2006.01) |

(56) References Cited

U.S. PATENT DOCUMENTS

| | | | | |
|---|---|---|---|---|
| 7,274,943 | B2 | 9/2007 | Trossen | |
| 2004/0022218 | A1* | 2/2004 | Kim et al. | 370/335 |
| 2004/0151192 | A1 | 8/2004 | Trossen | |
| 2005/0018689 | A1* | 1/2005 | Chudoba | 370/395.5 |
| 2005/0114491 | A1 | 5/2005 | Bushmitch et al. | |
| 2006/0258353 | A1* | 11/2006 | Makela et al. | 455/435.2 |
| 2007/0105532 | A1 | 5/2007 | Martin et al. | |
| 2007/0156909 | A1 | 7/2007 | Osborn et al. | |
| 2008/0189357 | A1* | 8/2008 | Prasad | G06Q 10/10 709/203 |
| 2008/0270614 | A1* | 10/2008 | Stumpert et al. | 709/227 |
| 2009/0111509 | A1 | 4/2009 | Mednieks et al. | |
| 2010/0029307 | A1* | 2/2010 | Hacena et al. | 455/466 |
| 2010/0303012 | A1* | 12/2010 | Atarius et al. | 370/328 |
| 2011/0039584 | A1* | 2/2011 | Merrett | H04L 51/36 455/466 |
| 2011/0106884 | A1* | 5/2011 | Agarwal | H04M 3/4938 709/204 |

FOREIGN PATENT DOCUMENTS

| | | | |
|---|---|---|---|
| WO | WO 2004/075507 | | 9/2004 |
| WO | 2009149345 | A2 | 12/2009 |

* cited by examiner

NETWORK-BASED SERVICE ACCESS FOR WIRELESS COMMUNICATION DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,914,463, issued Dec. 16, 2014, which* claims priority under 35 U.S.C. § 119(e) from U.S. Application Ser. No. 61/287,343 filed on Dec. 17, 2009. The '343 application, which is entitled, "Network-Based Service Access for Wireless Communication Devices," is expressly incorporated herein by reference.

BACKGROUND

The present invention relates generally to wireless communications devices, and particularly to wireless communication devices configured to access network-based services and applications.

There are many different network-based services and applications available to users. For example, Social Networking Services (SNS) are services that allow a user to create and join an online community of people and acquaintances who share similar interests and activities. Most SNSs are web-based services and provide a variety of ways for users to interact with each other. For example, some SNSs such as FACEBOOK, TWITTER, MYSPACE, and LINKEDIN, provide their respective users with e-mail capability and instant messaging services. Some SNSs also provide their users with a dedicated space (e.g., a "wall" on a FACEBOOK page) on which they can write messages to their community at-large, or receive messages from others. For example, users typically post periodic status updates to keep other people in their on-line community abreast of their current activities.

Users have historically accessed such network-based services, such as the social networking sites, from Personal Computers (PCs) such as desktop and laptop PCs; however, many vendors now provide mobile applications that execute on a user's cellular device to allow the user to interact with their services. These applications are typically graphics-rich and communicate with the servers hosting the services using a proprietary protocol. Therefore, such applications have enjoyed widespread usage only on "high-end" Smartphone devices such as APPLE'S iPHONE. The "lower-tier" and "mid-tier" cellular devices generally cannot use these applications because they lack the requisite graphics capability or have limited processing power. These cellular devices therefore may use a different "stripped-down" version of the application based on text and/or low-resolution graphics.

In many cases, conventional low and mid-tier cellular devices are capable of communicating messages over a variety of different bearers. For example, most phones can communicate voice over a voice bearer and SMS text messages over an SMS bearer. In some cases, these devices may also be able to communicate messages over the Internet, and thus, send and receive data over an IP bearer.

However, the bearer used to send and receive communications in one scenario may not be optimal for all communications in all scenarios.

SUMMARY

The present invention provides an application module for a wireless communication device that permits a user to access and communicate with a selected service or application, such as a Social Networking Service (SNS), for example, from their wireless device. The module comprises a lightweight client application that executes on the wireless communication device.

In one embodiment, a user enters data or information into a user interface of the device. An application module executing on the user's device selects a bearer service over which to communicate the data. The bearer service may be selected by the application module, or by the user, or responsive to a command received from a service provider. The application module converts the user input data into a format for transmission to the SNS using the selected bearer service. The application module also converts the data received from the SNS server into a format suitable for output to the user.

Thus, according to one embodiment of the present invention, an exemplary a low-tier or mid-tier wireless communications device comprises a user interface to receive user input data, memory configured to store an application module, and a controller. The controller is configured to execute the application module to receive the user input data from user interface, select a bearer service from a plurality of bearer services to carry the user input data to an SNS server in a communications network, and convert the user input data into one or more messages according to a protocol associated with the selected bearer service. The low-tier or mid-tier wireless communications device also comprises a transceiver configured to transmit the one or more messages to the SNS server over the selected bearer service.

In some embodiment, the controller is further configured to execute the application module to store metrics in the memory indicating how a user communicates with the SNS server, analyze the metrics based on one or more criteria, and select the bearer service based on the results of the analysis.

In one embodiment, the device further comprising a display configured to display the plurality of bearer services as options to the user.

In various embodiments of the present invention, the controller is further configured to generate a control signal to switch from a current bearer service to the selected bearer service.

In one embodiment, the controller is be configured to generate the control signal responsive to receiving user input selecting the bearer service.

In one embodiment, the controller is configured to generate the control signal responsive to receiving a command signal from the network identifying the selected bearer service.

In some embodiments, the controller is further configured to execute the application module to convert messages received from the SNS server and formatted according to a corresponding bearer service protocol into data for display to the user of the wireless communications device.

Embodiments of the present invention also provide an application module executed by a controller in a low-tier or mid-tier wireless communications device. For example, an exemplary application module comprises a plurality of conversion modules, each module being associated with a different bearer service and configured to convert user input data into one or more messages according to a corresponding bearer service protocol for transmission to an SNS server over an associated bearer channel, and a mediator module configured to select one of the conversion modules to perform the conversion, and to provide the user input data from the user interface to the selected conversion module.

In some embodiments, the mediator module is further configured to select the conversion module based on selected criteria comprising one or more of a least cost to the user, a least cost to a network provider, an amount of congestion in the network, the user's historically selected bearer services, a change in the user's tariff plan, and the user's activity for a given bearer service within a predetermined time period.

In various embodiments of the present invention, the mediator module is further configured to switch from a current conversion module to the selected conversion module.

In one embodiment, the mediator module is configured to switch to the selected conversion module responsive to receiving input identifying a new bearer service.

In one embodiment, the mediator module is configured to switch to the selected conversion module responsive to receiving a command signal identifying a new bearer service via a wireless communications network.

In various embodiments of the present invention, each conversion module is further configured to convert messages received from the SNS server into data for display to the user at the wireless communications device.

Embodiments of the present invention further provide a corresponding method of communicating user data between a low-tier or mid-tier wireless communications device and a network server associated with a Social Networking Service (SNS). An exemplary method comprises receiving user data bound for an SNS server at a user interface of a low-tier or mid-tier wireless communications device, switching from a current bearer service to a selected bearer service selected from among a plurality of bearer services available to the low-tier or mid-tier wireless communications device to communicate the user data to the SNS server, converting the user data to into one or more messages according to the selected bearer service, and transmitting the one or more messages to the SNS server over the selected bearer service.

In some embodiments of the present invention, the method further comprises storing metrics indicating how a user communicates with the SNS server and selecting the bearer service based on an analysis of the stored metrics.

In at least one embodiment, selecting a bearer service from a plurality of bearer services comprises selecting the bearer service based on an analysis of selected criteria comprising one or more of a least cost to the user, a least cost to a network provider, an amount of congestion in the network, the user's historically selected bearer services, a change in the user's tariff plan, and the user's activity for a given bearer service within a predetermined time period.

In some embodiments, switching from a current bearer service to a selected bearer service comprises switching to the selected bearer service responsive to receiving user input identifying the bearer service.

In one embodiment, switching from a current bearer service to a selected bearer service comprises switching to the selected bearer service responsive to receiving a command signal from a service provider via the communications network.

In various embodiments of the present invention, the method further comprises receiving messages from the SNS server in a first bearer service format, converting the received messages from the first bearer service format into data for display to the user on the user's wireless communications device, and displaying the converted messages to the user.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides an application module that configures a "low-tier" or "mid-tier" wireless communication device, such as a legacy cellular telephone, for example, to allow a user to send and receive communications with one or more services or applications. As defined herein, a "low-tier" or mid-tier" wireless communication device is generally a communication device that lacks the rich graphical and processing capabilities of a "SMARTPHONE" (e.g., APPLE'S iPHONE or a BLACKBERRY), but is still able to send and receive voice and text messages such as Short Message Service (SMS) messages. For illustrative purposes only, the following specification discusses the present invention in the context of communications between a "low-tier" or "mid-tier" wireless communications device and a Social Networking Services (SNS). Exemplary SNSs may include, but are not limited to, FACEBOOK, TWITTER, and MYSPACE. However, those skilled in the art will appreciate that the present invention is not limited to communication with SNSs, and may be used to allow a "low-tier" or "mid-tier" wireless communication device to communicate with any type of service or application.

The present invention also allows the user and/or a service provider to control the selection of a bearer service with which the user's device will use to communicate with the service or application, such as a selected SNS, based on various criteria. As used herein, a "bearer service" is application code and/or data defining one or more characteristics of an associated bearer channel, such as a protocol, that a user's device will use to carry data and information to communicate with a given SNS. By way of example, a given bearer service would include the logic and data needed to convert data between a format appropriate for the bearer channel associated with the given bearer service and another given format.

Such control over the selection of the bearer service may be transparent to the user of cellular device. For example, the cellular device may be configured to automatically select an appropriate bearer service to communicate with a selected service or application, such as an SNS, based on the user's historical usage or on the cost to use a particular bearer service. Alternatively, the user may manually select a desired bearer service based on suggestions received from the device. In one embodiment, a service provider may send a command to the cellular device to change the bearer service for communications based on network or revenue concerns.

Figure 1:
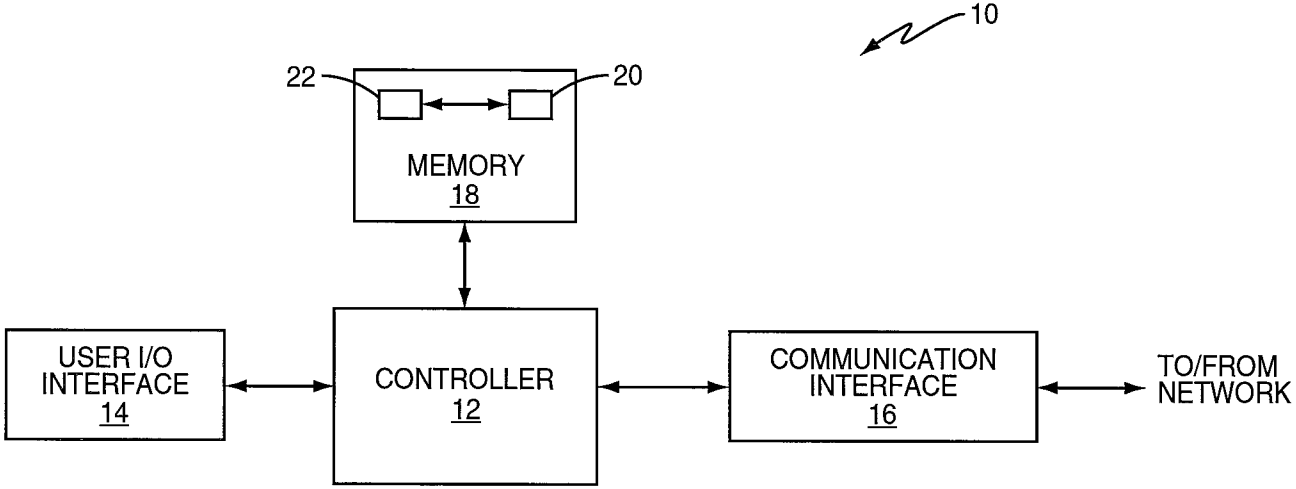
FIG. 1 is a block diagram illustrating some of the components of an exemplary wireless communication device configured according to one embodiment of the present invention.

Turning now to the drawings, FIG. 1 is a block diagram that illustrates some of the components of a "low-tier" or "mid-tier" wireless communication device. As seen in the figures and as discussed in the following specification, the wireless communication device is a cellular device 10 such as a cellular telephone. However, those skilled in the art will readily appreciate that this is for illustrative purposes only, and that the present invention is suitable for use with other devices and types of devices as well.

Cellular device 10 comprises a programmable controller 12, a user input/output interface 14, a communications interface 16, and a memory 18. As described in more detail later, memory 18 stores an application module 20. The application module 20 is a computer program that, when executed by controller 12, allows a user of device 10 to communicate messages with a user-selected SNS such as FACEBOOK or TWITTER, for example. The application module 20 may control the controller 12 to periodically collect a variety of different metrics indicative of how the user communicates with the SNS, and store those metrics in a database 22. The application module 20 could then use those metrics to determine which of a plurality of different bearer services to use for sending and receiving communications to/from a given SNS.

Controller 12 generally controls the overall operation of device 10 according to programs and instructions stored in memory 18. The controller 12, which may be implemented in hardware, firmware, software, or a combination thereof, may comprise a single microprocessor or multiple microprocessors. The microprocessors may be general purpose microprocessors, digital signal processors, or other special purpose processors. The controller 12 executes the instructions in the application module 20 to facilitate the user's communication with one or more SNSs and to control which of a plurality of bearer services the user's device will use to communicate with the SNS. In some embodiments, the application module 20 controls the controller 12 to collect and store the metrics.

The User Interface (UI) 14 includes one or more user input devices and a display to enable the user to interact with and control the device 10. The UI 14 may include input/output devices such as a keypad, touchpad, joystick control dials, control buttons, display, speaker, microphone, or a combination thereof. Using the UI 14, a user is able to interact with an interface presented to the user by application module 20 to input messages intended to be sent to a given SNS. The interface also displays messages received from the SNS to allow the user to view statuses, notifications, and other artifacts of an SNS typically available to users having SMARTPHONES.

The communication interface 16 allows the device 10 to communicate messages and other data with one or more remote parties and/or devices. In this embodiment, the communication interface 16 comprises a fully functional cellular radio transceiver that can operate according to any known standard, including the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In other embodiments, however, the communication interface 16 may comprise a hardware port, such as an Ethernet port, for example, that connects device 10 to a packet data communications network. In yet another embodiment, the communication interface 16 may comprise a wireless LAN (802.11x) interface.

Memory 18 comprises a computer-readable medium that may include both random access memory (RAM) and read-only memory (ROM). Although not specifically shown, those skilled in the art will appreciate that the memory 18 may also be embodied other hardware components, such as compact disks (CDs), hard drives, tapes, and digital video disks (DVDs) that may be connected to the cellular device 10 via a system interface port (not shown). Computer program instructions and data required for operation are stored in non-volatile memory, such as EPROM, EEPROM, and/or flash memory, which may be implemented as discrete devices, stacked devices, or integrated with the controller 12.

As previously stated, memory 18 stores an application module 20 that contains the computer code and instructions to allow a person to interact with an SNS. The application module 20 receives user input entered by the user via UI 14. Then, transparently to the user, the application module 20 converts the received user input to one or more messages according to a protocol that is appropriate for a bearer channel that will be used to communicate the messages. Similarly, the application module 20 will convert messages received from an SNS and send them to a display on UI 14 for the user.

The application module 20 also periodically collects a variety of different metrics indicative of how the user communicates with the SNS, and stores those metrics in a database 22. Based on these metrics, the application module 20 will determine the bearer service to select to effect communications with the SNS, or present the user with an option to change or specify the bearer service. Making the decision on which bearer service to use for the communications may be performed in any matter known in the art.

For example, the application module 20 may analyze a variety of different criteria including, but not limited to, cost to the user or to the network provider, network congestion, and a user's historical usage. Based on this analysis, the application module could then automatically determine the appropriate bearer service for the user, or provide the user with a list of possible bearer services and an option to change the current bearer service. In another embodiment, the service provider may wish to control which bearer service the user communicates the messages over based on cost or routing. In these cases, the application module 20 may receive a command signal from the service provider that automatically causes the cellular device to use a specified bearer service.

Figure 2:
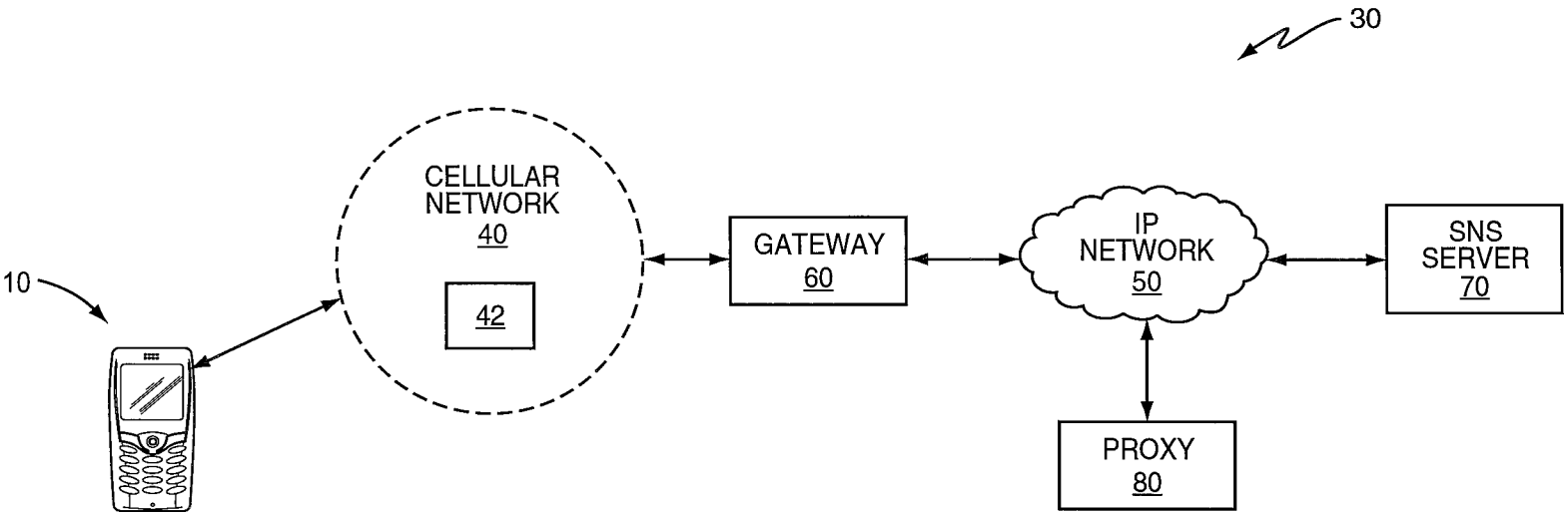
FIG. 2 is a block diagram illustrating some of the components of a network suitable for use with one embodiment of the present invention.

FIG. 2 illustrates a mobile communication network 30 suitable for use according to one exemplary embodiment of the invention. The mobile communication network 30 comprises a conventional cellular network 40 providing voice and/or data services and an IP network 50 interconnected with the cellular network 40 providing IP services. A low or mid-tier cellular device 10 is shown in communication with the cellular network 40. The cellular network 40 may, for example, comprise a GSM, GPRS or EDGE network, although other access technologies can also be used. The cellular network 40 includes a messaging center 42 for providing SMS services to the cellular device 10.

The IP network 50 may, for example, comprise any publicly and/or privately available packet data communication network such as the Internet. The IP network 50 may, in one embodiment, use the Session Initiation Protocol (SIP) as a signaling protocol for communication between end devices. As is known in the art, SIP is a text-based signaling protocol used for setting-up, modifying, and tearing down media sessions. However, SIP has also been extended for use in instant messaging services. A cellular gateway 60 interconnects the cellular network 40 and the IP network 50 to allow SMS messages to be communicated between the cellular device 10 and an SNS server 70 via the IP network 50. In this exemplary embodiment, the cellular gateway 60 converts SMS messages from the cellular device 10 into messages that can be sent to and understood by the SNS server 70. Additionally, the cellular gateway 60 converts messages from the SNS server 70 into SMS messages that can be sent to and understood by the cellular device 10.

A proxy server 80 is connected to the IP network 50, though it may reside within the IP network 50. The proxy 80 provides a presence for the cellular device 10 in the IP network 50. Particularly, cellular device 10 uses the SMS messages to send command messages and text, such as user updates that are bound for SNS server 80, to the proxy 80 via the cellular gateway 60. The messages may include an identifier identifying the cellular device 10 to the cellular gateway 60 and proxy server 80. Upon receipt, the cellular gateway 60 converts the messages received from the cellular device 10 into standard IP packets, and forwards the converted messages to the proxy server 80 for further processing. Upon receipt, the proxy server 80 stores the identifier for the cellular device 10 and forwards the message onto the SNS server 70.

For return data, the proxy server 80 receives messages from the SNS server 70 that are bound for the cellular device 10. However, since the cellular device 10 is a low or mid-tier device, it may not have an IP address. Therefore, the SNS server 70 may not be able to send messages directly to the cellular device 10. In these cases, the SNS server 70 would send the message for cellular device 10 to the proxy 80. Upon receipt, the proxy 80 would analyze the message and resolve the identity of the cellular device 10. Once resolved, the proxy server 80 would forward the message to the cellular gateway 60 for transmission to cellular device 10.

By sending messages to the proxy server 80 through the cellular gateway 60, low and mid-tier cellular devices 10 can perform a wide variety of control and monitoring tasks on the SNS server 80 that historically have been accessible only to users with PC and/or applications that run on high-end SMARTPHONES.

Figure 3:
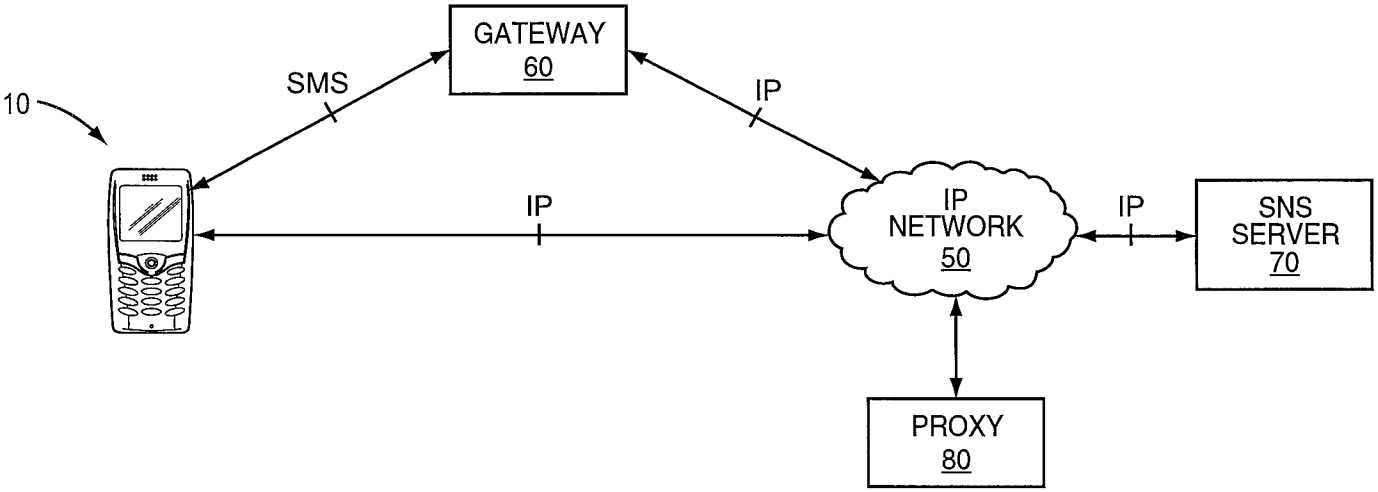
FIG. 3 illustrates exemplary communication paths according to one embodiment of the present invention.
Figure 4:
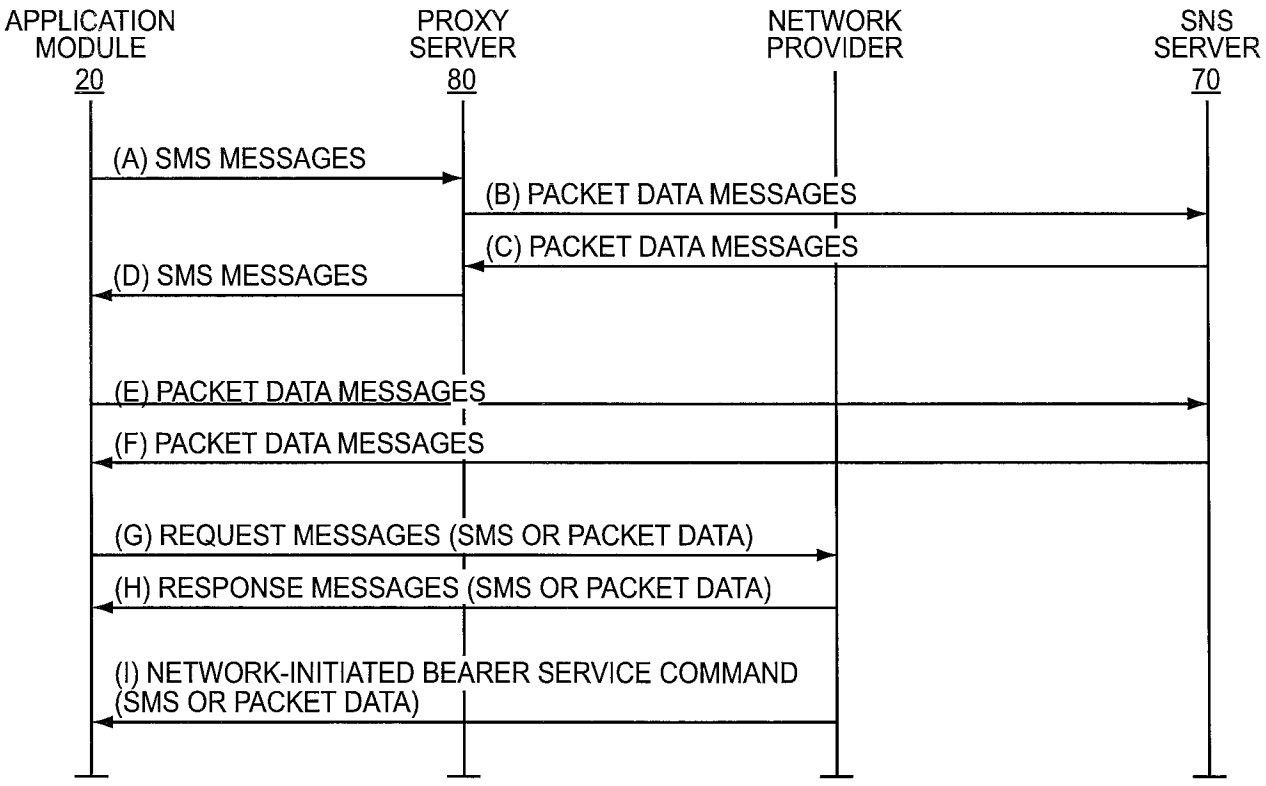
FIG. 4 illustrates some high-level call flows showing how a cellular device configured according to one embodiment of the present invention can communicate with an SNS server in the network.

FIGS. 3 and 4 illustrate an embodiment wherein the cellular device 10 is configured to be able to communicate with the SNS server 80 using SMS messages and/or data packets. Particularly, in one embodiment, the application module 20 could comprise a composite application that contains code and instructions for both SMARTPHONES and low or mid-tier devices. The functionality executed would depend on the type of device that launched the application. For example, because low or mid tier devices might not have the resources required to execute all of the available functions, those device would only have access to a subset of the functionality available. However, with its larger resource pool, a SMARTPHONE would be able to access all functionality.

As seen in FIGS. 3-4, the cellular device 10 may send and receive data and information to and from the SNS server 80 using SMS messages, as previously described (A-D of FIG. 4). Particularly, the application module 20 of cellular device 10 receives user input from the user via UI 14, and would generate one or more SMS messages to include the user input and send the SMS messages to the proxy server 80 via the cellular gateway 60. The cellular gateway 60 would convert the received SMS messages into IP packets, and send the IP packets to the proxy server 80, which maintains a presence for the cellular device 10. The proxy server 80 then forwards the IP packets to the SNS server 70. In reverse, the SNS server 80 sends IP packets to the proxy server 70. After determining the identity of the desired recipient device, the proxy server 80 sends the IP packets to the cellular gateway 60, which converts them to SMS messages and sends them to the cellular device 10.

In another embodiment, the cellular device 10 may also be able to communicate directly with the SNS server 80 via data packets and the IP network 50 (E-F of FIG. 4). In these cases, the application module 20 could be equipped with the necessary functionality to generate and communicate packet data with the SNS server 70. As seen in more detail later, the cellular device 10 of this embodiment may be able to switch back and forth between using SMS and IP as a carrier for the messages communicated between the cellular device 10 and the SNS server 80 based on various criteria.

In addition, the application module 20 could also include logic and instructions that permit the application module 20 to change the bearer service that the cellular device 10 will use, and receive commands and instructions from external sources to change the bearer service. Changing a bearer service could, for example, be based on information received from a network provider regarding the particular tariff charges. For example, the application module 20 could generate a request message and send it to a server associated with the network provider to request information on the tariff charges associated with the user (G of FIG. 4), Responsive to the request message, the server would provide the information to the cellular device 10 (H of FIG. 4). Upon receiving the information, the application module 20 would analyze the information and, based on the analysis, reconfigure itself to utilize the same or a different bearer service.

In another embodiment, the network provider may autonomously cause the application module 20 to reconfigure itself to use a particular bearer service (I of FIG. 4). Specifically, while monitoring communications, the network provider may notice congestion or cost issues regarding one or both of the bearer services. Therefore, to ease congestion or to facilitate a more cost-effective routing, the network provider could send a predetermined command directly to the application module 20. Upon receiving the command, the application module 20 would reconfigure itself to use the specified bearer service. Such reconfiguration could occur with or without alerting the user.

Figure 5:
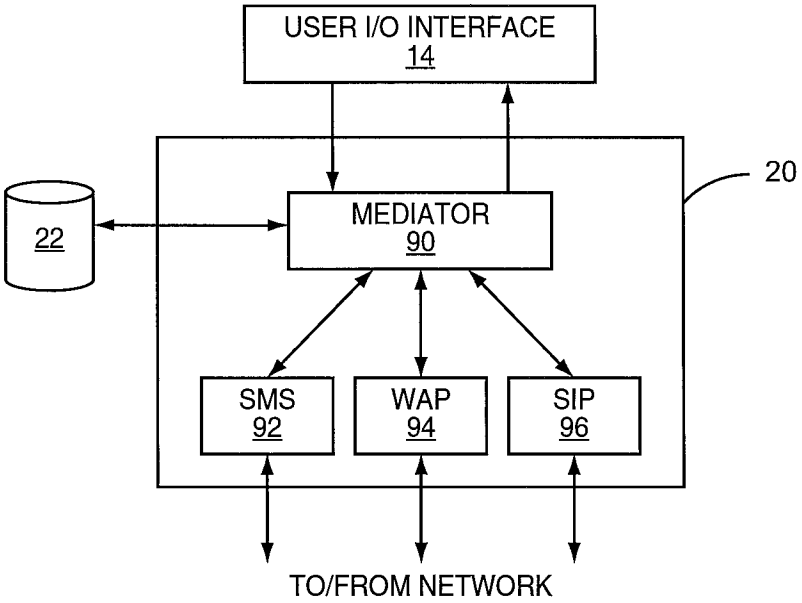
FIG. 5 is a block diagram illustrating some of the components of an application module configured according to one embodiment of the present invention.

FIG. 5 illustrates some of the functional elements of the application module 20 according to one embodiment of the present invention. As seen in FIG. 5, the application module 20 includes a mediator 90 and one or more conversion modules. In this embodiment, the conversion modules comprise an SMS module 92, a WAP module 94, and a SIP module 96; however, other modules are also possible.

The mediator 90 communicates with the UI 14 to receive user input and display output to the user. The user input may be, for example, text associated with accessing and/or updating the user's information on the user's personal SNS page. The output could be the user's personal SNS page, or notifications to the user regarding another user's personal SNS page. According to the present invention, the mediator 90 determines an appropriate bearer service to use for communications between the cellular device 10 and the SNS server 70. Once determined, the mediator 90 converts the user input into a format appropriate for the selected bearer service, and formats the incoming messages from the SNS server 70 into an appropriate format for output to the user. Thus, the mediator 90 functions as a "switch" to direct input/output through the appropriate conversion module where the data conversions are performed.

To determine an appropriate bearer service, the mediator 90 may access data and information stored the database 22 in memory 18, and then use that data to determine whether the application module 20 should communicate with the SNS server 70 via SMS or via WAP or via some other protocol such as SIP. The data upon which the decision is based may comprise metrics indicative of the user's historical usage pattern of communicating with the SNS server 70. Alternatively, the mediator 90 may determine an appropriate bearer service based on messages and/or commands received from a network provider. However, the information and data used by the mediator as a basis in which to determine an appropriate bearer service to use may comprise any information needed or desired, and may be stored locally in database 22 and/or provided by a network operator.

Figure 6:
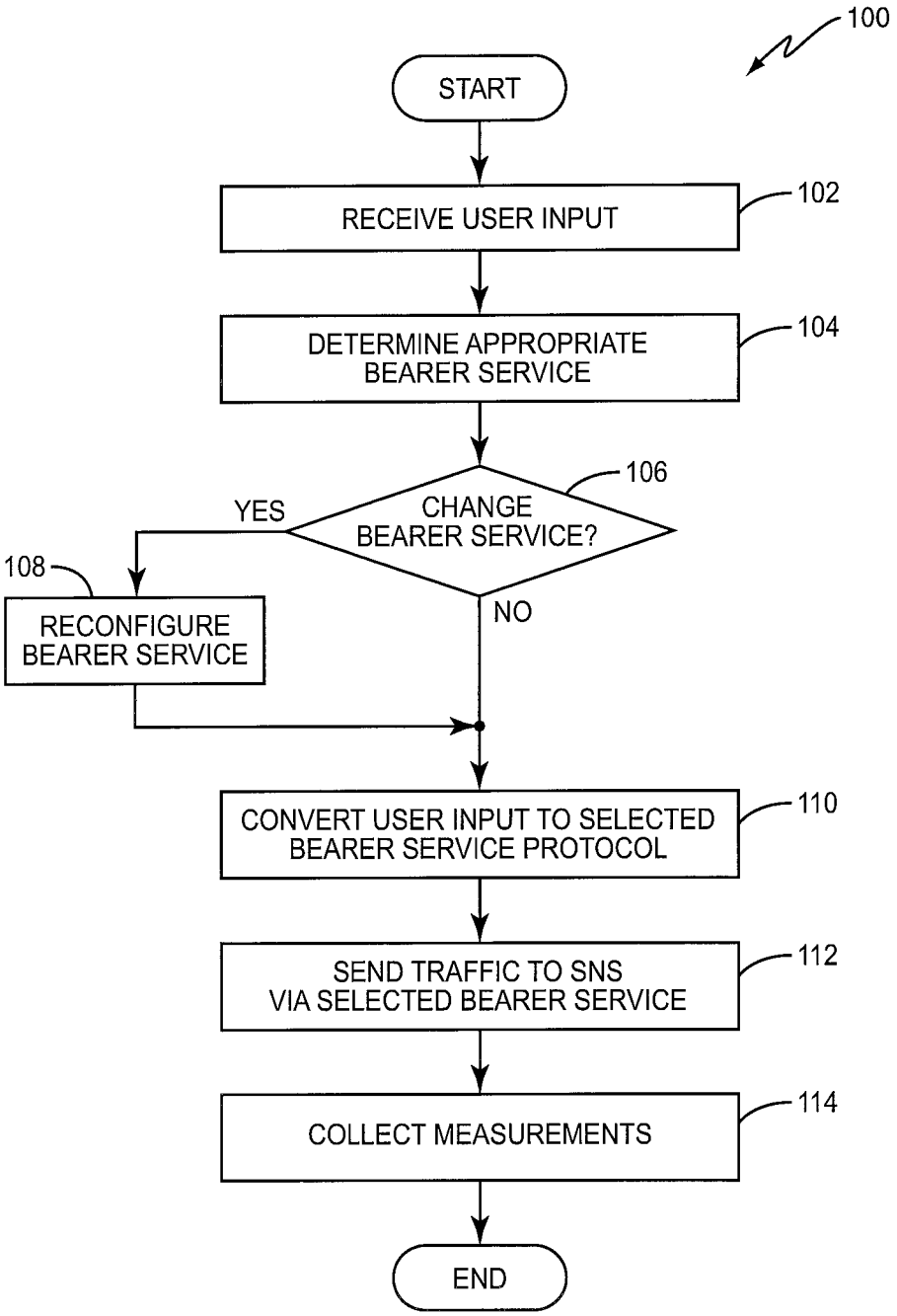
FIG. 6 is a flow chart illustrating one exemplary method of sending information and/or data to the SNS according to one embodiment of the present invention.

FIG. 6 is a flow chart illustrating an exemplary method 100 in which the application module 20 operates to send user input to an SNS server 70. The method 90 begins with the mediator 90 receiving user input from the UI 14 on cellular device 10 (box 102). Once received, the mediator 90 determines which bearer service to use for communicating the user input to the SNS server 70 (box 104). As previously stated, the data upon which the decision is based can be any criteria needed or desired. The criteria can be based on information stored locally in database 22, or provided to the cellular device 10 by the network provider in response to a request message generated by the mediator 90. If the mediator 90 determines if the cellular device 10 should be reconfigured to utilize a different bearer service (box 106), the mediator 90 will set the application module 20 to use the selected bearer service (box 108) and direct the user input to the corresponding conversion module 92, 94, or 96 (box 110). If the mediator determines that the cellular device need not be reconfigured, the mediator 90 will simply direct the user input to the conversion module 92, 94, or 96 corresponding to the current bearer service (box 110).

At the conversion modules 92, 64, or 96, one or more messages are generated to include the user input. Each conversion module 92, 94, 96 will generate their respective messages according to their respective standards and protocols. These protocols are well known in the art, and thus, are not described in detail here. The conversion modules 92, 94, 96 then send the generated messages to the network (box 112) and collect measurement data for storage in database 22 (box 114).

In FIG. 6, the mediator 90 determines whether the cellular device 10 should be reconfigured to utilize a new bearer service based on locally stored information. Such information can comprise any amount or type of metrics or data needed or desired. For example, in one embodiment, the information comprises traffic statistics. Thus, the mediator 90 may select a bearer service based on the number of SMS messages the user has already sent and/or received, or based on a measure of the user's packet data usage. In other embodiments, the mediator 90 may select a bearer service based on the number of times the mediator 90 has already changed the bearer service.

In some embodiments, the decision may be based on a history of the user's tariff configurations. For example, if a pre-pay subscriber opts to upgrade his current plan, or opts to change to a post-pay tariff plan, the mediator 90 may change the bearer service to one that is more cost effective for the user based on the new tariff plan. Alternatively, the mediator 90 may not immediately change the bearer service, but the rule and conditions associated with the new tariff plan may effect the decision on whether to change the bearer service. By way of example, by changing from one plan to another, a user may receive an increase in the number of "free" SMS messages he or she can send and receive, or may have the limit waived. Since the SMS messages are "free," the mediator 90 might then be configured to select the SMS conversion module 92 rather than selecting a more expensive alternative. Similarly, a user may change a current tariff plan from having no packet data access to having packet data access. Assuming that communicating via packet data would be even less expensive, the mediator 90 could reconfigure itself to use the WAP conversion module 94 to communicate with the SNS server 70 instead of utilizing SMS messages.

In addition to various least-cost methods of determining a bearer service, the present invention may determine the bearer service to be one that would provide the service provider with the greatest potential revenue. Another criterion is a comparison between the cost/kB for packet data access versus cost/kB for SMS access. In some cases, the mediator 90 could select the bearer service based on that revenue landscape. In other embodiments, the mediator 90 could base a decision on bearer service-independent statistics, such as the number of "friends" a user has on a given SNS, or how many images or other multi-media files the user uploaded/downloaded in a specified time period.

Although the cellular device 10 is able to make a decision based on locally stored data, the present invention is not so limited. In another embodiment, for example, the mediator 90 does not make that decision. Rather, the network collects and analyzes the above-mentioned data, and sends a signal to the cellular device 10 in the form of a message, for example, based on the findings. The message could include one or more commands that will automatically cause the mediator 90 to switch to a specified bearer service. The user of the cellular device 10 may or may not be aware of the messages changing the user's plan.

Figure 7:
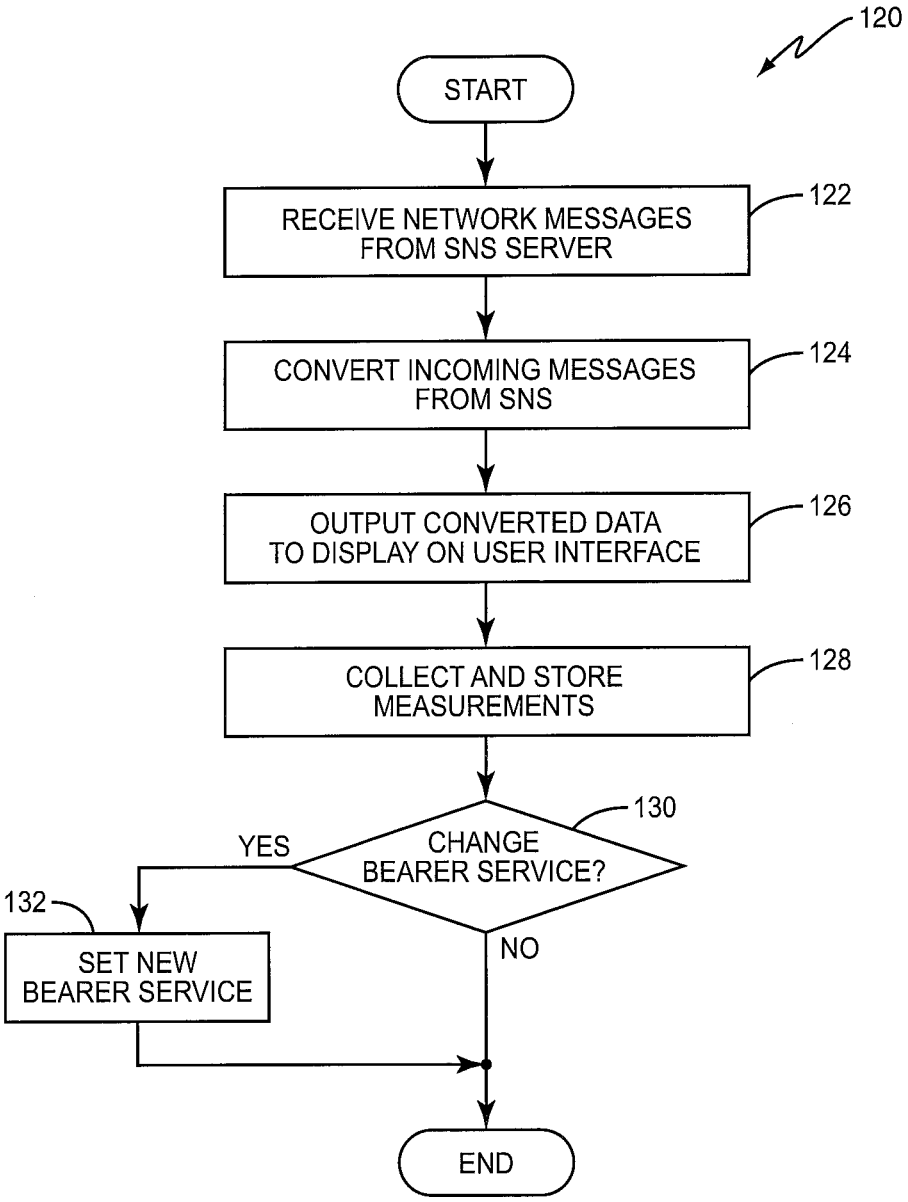
FIG. 7 is a flow chart illustrating one exemplary method of receiving information and/or data from the SNS according to one embodiment of the present invention.

FIG. 7 is a flow chart illustrating another method 120 in which the application module 20 receives data from the SNS server 70 for output to the user. Method 120 begins with one of the conversion modules 92, 94, 96 receiving one or more messages from the network (box 122). The conversion module 92, 94, or 96 converts the incoming messages into a format appropriate for output to the user (box 124). The mediator 90 then generates the command signals needed to output the converted data to the UI 14, such as to a display associated with the UI 14 (box 126). Once output, the mediator 90 may then collect and store metrics to assist the mediator in determine whether to reconfigure the cellular device 10 to use the same or different bearer service (box 128). As above, the mediator 90 can present the user with a display window asking the user whether he or she would like to change bearer services (box 130). If the user replies positively, the mediator 90 will reconfigure the cellular device to use the new specified bearer service (box 132).

In addition to the foregoing, the mediator 90 of the present invention may be configured to be activated and/or deactivated remotely. Further, to save time and resources, the cellular device 10 may be configured to refresh the information displayed to the user only when the user explicitly requests the update, or only after some predetermined time has elapsed. This would help to reduce unnecessary traffic associated with SNSs.

The present invention may, of course, be carried out in other ways than those specifically set forth herein without departing from essential characteristics of the invention. For example, the previous embodiments described the present invention in the context of communicating with a SNS application such as FACEBOOK or TWITTER. However, those skilled in the art will appreciate that the present invention is not so limited. The present invention may also be used to communicate with other servers such as those providing games and/or information. The present embodiments are therefore to be considered in all respects as illustrative and not restrictive, and all changes coming within the meaning and equivalency range of the appended claims are intended to be embraced therein.

What is claimed is:

1. A [low-tier or mid-tier] wireless communications device comprising:

a user interface to receive user input data;

memory configured to store an application module;

a controller configured to execute the application module to:

receive the user input data from the user interface;

*receive a command signal from a communications network that identifies a selected bearer service of a plurality of bearer services;*

*responsive to receiving the command signal from the communications network,* select [a] *the selected* bearer service [from a] *of the* plurality of bearer services to carry the user input data to a Social Networking Service (SNS) server in [a] *the* communications network; and convert the user input data into one or more messages according to a protocol associated with the selected bearer service; and a transceiver configured to transmit the one or more messages to the SNS server over the selected bearer service.

[2. The device of claim 1 wherein the controller is further configured to execute the application module to:

store metrics in the memory indicating how a user communicates with the SNS server;

analyze the metrics based on one or more criteria; and select the bearer service based on the results of the analysis.]

[3. The device of claim 1 further comprising a display configured to display the plurality of bearer services as options to the user.]

[4. The device of claim 1 wherein the controller is further configured to generate a control signal to switch from a current bearer service to the selected bearer service.]

[5. The device of claim 4 wherein the controller is configured to generate the control signal responsive to receiving user input selecting the bearer service.]

[6. The device of claim 4 wherein the controller is configured to generate the control signal responsive to receiving a command signal from the network identifying the selected bearer service.]

7. The device of claim 1 wherein the controller is further configured to execute the application module to convert messages received from the SNS server and formatted according to a corresponding bearer service protocol into data for display to the user of the wireless communications device.

8. A non-transitory computer readable medium having an application module stored thereon, the application module being executable by a controller in a [low-tier or mid-tier] wireless communications device and comprising:

a plurality of conversion modules, each module being associated with a different bearer service and configured to convert user input data into one or more messages according to a corresponding bearer service protocol for transmission to a Social Networking Service (SNS) server over an associated bearer channel; and a mediator module configured to select one of the conversion modules to perform [the] *a* conversion, and to provide the user input data from [the] *a* user interface *of the wireless communications device* to the selected conversion module, *wherein the mediator module is configured to select the selected conversion module responsive to receiving a command signal identifying a selected bearer service via a wireless communications network.*

[9. The non-transitory computer readable medium of claim 8 wherein the mediator module is further configured to select the conversion module based on selected criteria comprising one or more of:

a least cost to the user;

a least cost to a network provider;

an amount of congestion in the network;

the user's historically selected bearer services;

a change in the user's tariff plan; and the user's activity for a given bearer service within a predetermined time period.]

[10. The non-transitory computer readable medium of claim 8 wherein the mediator module is further configured to switch from a current conversion module to the selected conversion module.]

[11. The non-transitory computer readable medium of claim 10 wherein the mediator module is configured to switch to the selected conversion module responsive to receiving input identifying a new bearer service.]

[12. The non-transitory computer readable medium of claim 8 wherein the mediator module is configured to switch to the selected conversion module responsive to receiving a command signal identifying a new bearer service via a wireless communications network.]

13. The non-transitory computer readable medium of claim 8 wherein each conversion module is further configured to convert messages received from the SNS server into data for display to the user at the wireless communications device.

14. A method of communicating user data between a [low-tier or mid-tier] wireless communications device and a network server associated with a Social Networking Service (SNS), the method comprising:

receiving user data bound for [an] *the* SNS server at a user interface of [a low-tier or mid-tier] *the* wireless communications device;

*responsive to receiving a command signal from a service provider,* switching from a current bearer service to a selected bearer service selected from among a plurality of bearer services available to the [low-tier or mid-tier] wireless communications device to communicate the user data to the SNS server;

converting the user data into one or more messages according to the selected bearer service; and transmitting the one or more messages to the SNS server over the selected bearer service.

[15. The method of claim 14 further comprising:

storing metrics indicating how a user communicates with the SNS server; and selecting the bearer service based on an analysis of the stored metrics.]

[16. The method of claim 14 wherein selecting a bearer service from a plurality of bearer services comprises selecting the bearer service based on an analysis of selected criteria comprising one or more of:

a least cost to the user;

a least cost to a network provider;

an amount of congestion in the network;

the user's historically selected bearer services;

a change in the user's tariff plan; and the user's activity for a given bearer service within a predetermined time period.]

[17. The method of claim 14 wherein switching from a current bearer service to a selected bearer service comprises switching to the selected bearer service responsive to receiving user input identifying the bearer service.]

[18. The method of claim 14 wherein switching from a current bearer service to a selected bearer service comprises switching to the selected bearer service responsive to receiving a command signal from a service provider via the communications network.]

19. The method of claim 14 further comprising:

receiving messages from the SNS server in a first bearer service format;

converting the received messages from the first bearer service format into data for display [to the user] on the [user's] wireless communications device; and displaying the converted messages [to the user].

*20. The device of claim 1 wherein the plurality of bearer services includes a short message service (SMS) bearer service and an internet protocol (IP) bearer service.*

*21. The device of claim 1 wherein the communications network comprises a cellular communications network.*

*22. The device of claim 1 wherein the transceiver comprises a cellular radio transceiver.*

*23. The device of claim 1 wherein the communications network comprises a cellular network that provides voice and data services, and an IP network that is interconnected with the cellular network and that provides IP services.*

*24. The non-transitory computer readable medium of claim 8 wherein at least one of the different bearer services is a short message service (SMS) bearer service and wherein at least another one of the different bearer services is an internet protocol (IP) bearer service.*

*25. The non-transitory computer readable medium of claim 8 wherein the wireless communications network comprises a cellular communications network.*

*26. The non-transitory computer readable medium of claim 8 wherein the wireless communications network comprises a cellular network that provides voice and data services, and an IP network that is interconnected with the cellular network and that provides IP services.*

*27. The method of claim 14 wherein the plurality of bearer services includes a short message service (SMS) bearer service and an internet protocol (IP) bearer service.*

*28. The method of claim 14 wherein the wireless communications device operates on a cellular communications network.*

*29. The method of claim 14 wherein the one or more messages are transmitted via a cellular radio transceiver.*

*30. The method of claim 14 wherein the communications device operates on a communications network, and wherein the communications network comprises a cellular network that provides voice and data services, and an IP network that is interconnected with the cellular network and that provides IP services.*

*31. A wireless communication device comprising:*

*a user interface configured to receive user input data;*

*a processing circuit configured to:*

*receive the user input data from the user interface;*

*request, from a network, information indicative of a selected bearer service selected from a plurality of bearer services;*

*receive a command signal from the network identifying the selected bearer service;*

*responsive to receiving the command signal, switch to the selected bearer service; and*

*convert the user input data into one or more messages according to a protocol associated with the selected bearer service; and*

*a communication interface configured to transmit the one or more messages to a Social Networking Service (SNS) server over the selected bearer service.*

*32. The device of claim 31 wherein the plurality of bearer services includes a short message service (SMS) bearer service and an internet protocol (IP) bearer service.*

*33. The device of claim 31 wherein the network comprises a cellular communications network.*

*34. The device of claim 31 wherein the communication interface comprises a cellular radio transceiver.*

*35. The device of claim 31 wherein the network comprises a cellular network that provides voice and data services, and an IP network that is interconnected with the cellular network and that provides IP services.*

*36. A method of operating a wireless communication device in a network, the method comprising:*

*receiving user input data;*

*requesting from the network information indicative of a selected bearer service selected from a plurality of bearer services;*

*receiving a command signal from the network identifying the selected bearer service;*

*responsive to receiving the command signal, switching to the selected bearer service;*

*converting the user input data into one or more messages according to a protocol associated with the selected bearer service; and*

*transmitting the one or more messages to an SNS server over the selected bearer service.*

*37. The method of claim 36 wherein the plurality of bearer services includes a short message service (SMS) bearer service and an internet protocol (IP) bearer service.*

*38. The method of claim 36 wherein the network comprises a cellular communications network.*

*39. The method of claim 36 wherein the one or more messages are transmitted over a cellular radio transceiver.*

*40. The method of claim 36 wherein the network comprises a cellular network that provides voice and data*

*services, and an IP network that is interconnected with the cellular network and that provides IP services.*

*41. A non-transitory computer readable medium having instructions stored thereon, which instructions, when executed by a controller in a wireless communications device, cause the wireless communication device to perform steps comprising:*

*requesting from the network information indicative of a selected bearer service selected from a plurality of bearer services;*

*receiving a command signal from the network identifying the selected bearer service;*

*responsive to receiving the command signal, switching to the selected bearer service;*

*converting user input data into one or more messages according to a protocol associated with the selected bearer service; and*

*transmitting the one or more messages to an SNS server over the selected bearer service.*

*42. The non-transitory computer readable medium of claim 41 wherein the plurality of bearer services includes a short message service (SMS) bearer service and an internet protocol (IP) bearer service.*

*43. The non-transitory computer readable medium of claim 41 wherein the network comprises a cellular communications network.*

*44. The non-transitory computer readable medium of claim 41 wherein the one or more messages are transmitted over a cellular radio transceiver.*

*45. The non-transitory computer readable medium of claim 41 wherein the network comprises a cellular network that provides voice and data services, and an IP network that is interconnected with the cellular network and that provides IP services.*

* * * * *